United States Patent
Church

[19]

[11] Patent Number: 5,875,583
[45] Date of Patent: Mar. 2, 1999

[54] PLANER BOARD

[75] Inventor: Bill H. Church, Sodus, Mich.

[73] Assignee: Church Tackle Company, Sodus, Mich.

[21] Appl. No.: 846,470

[22] Filed: May 1, 1997

[51] Int. Cl.$^6$ ............................................. A01K 91/00
[52] U.S. Cl. ........................................................ 43/43.13
[58] Field of Search ............................ 43/43.12, 43.13, 43/43.14

[56] References Cited

U.S. PATENT DOCUMENTS

| | | | |
|---|---|---|---|
| 780,029 | 1/1905 | Flegle . | |
| 2,825,994 | 3/1958 | Bruhn | 43/43.13 |
| 3,067,537 | 12/1962 | Hines | 43/42.74 |
| 3,067,539 | 12/1962 | Black | 43/43.13 |
| 3,507,068 | 4/1970 | Roberts | 43/43.13 |
| 3,818,624 | 6/1974 | Duffy | 43/43.13 |
| 3,949,512 | 4/1976 | Stegemeyer | 43/43.13 |
| 4,028,840 | 6/1977 | Wille | 43/43.13 |
| 4,138,793 | 2/1979 | Kellie | 43/43.13 |
| 4,524,538 | 6/1985 | Halvorsen | 43/43.13 |
| 4,698,933 | 10/1987 | Shaw | 43/43.13 |
| 4,745,702 | 5/1988 | Koch | 43/43.13 |
| 4,920,589 | 5/1990 | Anderson | 43/43.13 |
| 4,920,689 | 5/1990 | Anderson | 43/43.13 |
| 5,163,246 | 11/1992 | Shaw | 43/43.12 |
| 5,548,919 | 8/1996 | Hicks | 43/43.13 |

OTHER PUBLICATIONS

Wille Products Instruction Sheet (published on or before May 1, 1996).
Off Shore Tackle and packaging for the OR 12 Side Planer—Instruction Sheet (published on or before Aug., 1994).

*Primary Examiner*—Thomas Price
*Attorney, Agent, or Firm*—Woodward, Emhardt, Naughton Moriarty & McNett

[57] ABSTRACT

A planer board includes a generally flat rectangular body member having front and rear faces, leading and trailing ends and top and bottom edges and having a structure for keeping the member afloat in water, and wherein the leading end is tapered from the front face to the rear face to define at least one ramp to bias the body member to one side as the body member is pulled through the water; a weight connected to the bottom edge of the plate; a line-gripping assembly rigidly extending from the front face of the body member for releasably gripping a fishing line; and, a line guidance assembly at the trailing end of the body member for encircling the fishing line and allowing for manual transverse release of the line when desired.

27 Claims, 2 Drawing Sheets

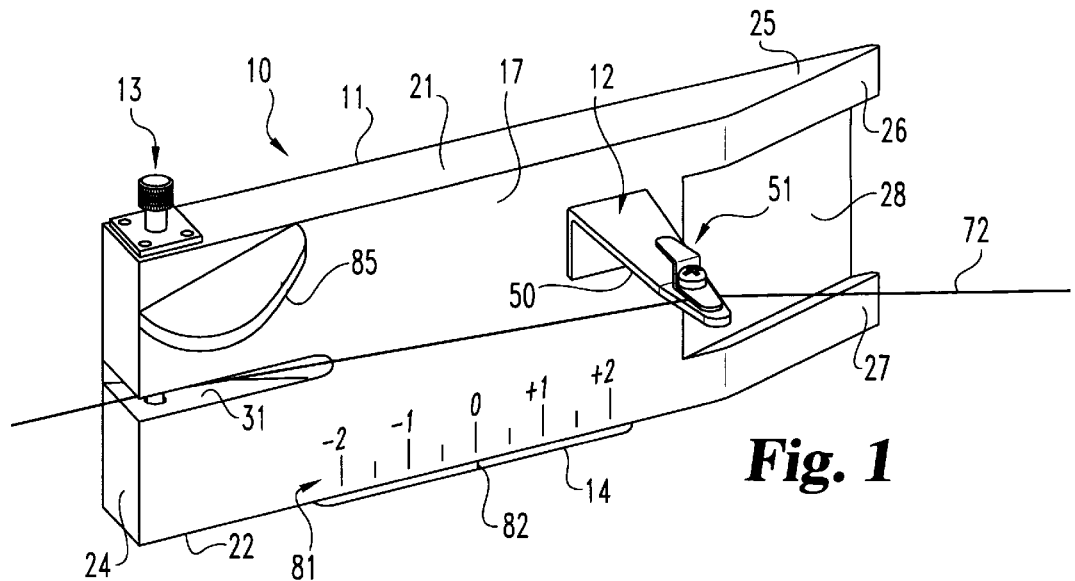
Fig. 1
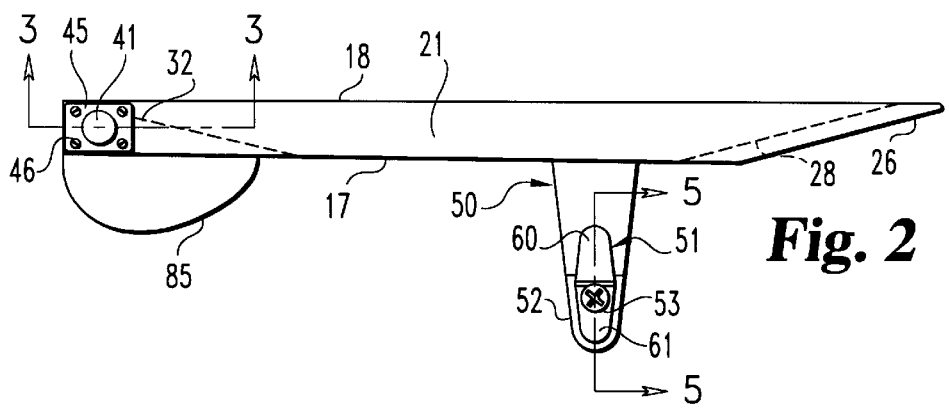
Fig. 2
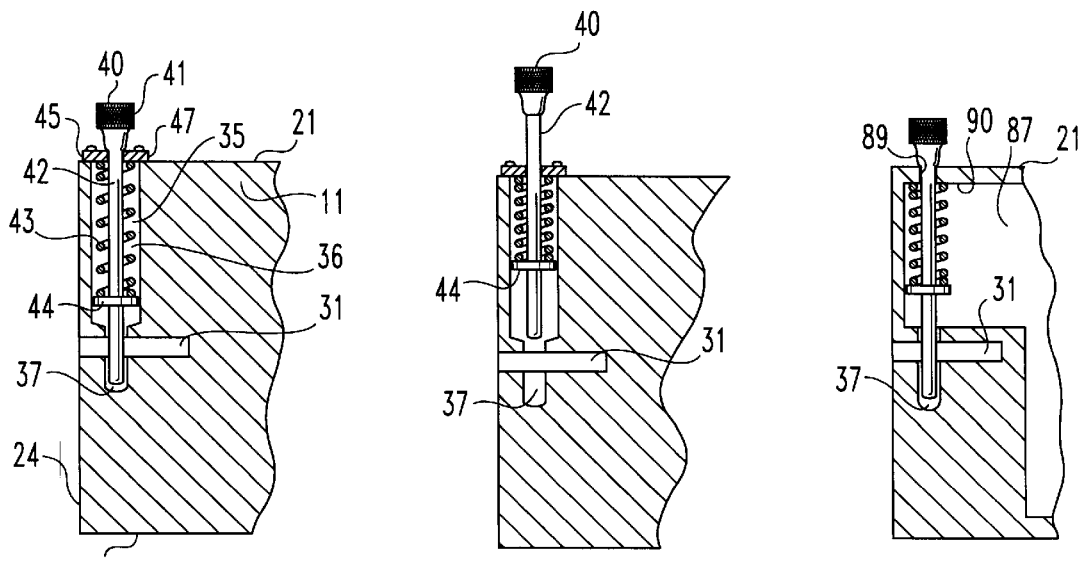
Fig. 3
Fig. 4
Fig. 10

PLANER BOARD

FIELD OF THE INVENTION

The present invention relates to the field of fishing equipment, and more particularly to a planer board apparatus with a quick-release line-gripping assembly and quick-release line-guidance assembly.

BACKGROUND OF THE INVENTION

In the art of fishing, it is common to troll from a boat or fish from the shore of a stream. To avoid fishing in the roiled water in the wake of the boat from which fish are generally driven, and to avoid the dragging of a fishing line toward a stream bank by the stream current, devices known as planer boards have been developed which act to pull the fishing line to one side of the boat wake or out toward the middle of the stream. Generally, such devices consist of a block having a wedge-like leading end with the devices being connected in various ways to the fishing line. U.S. Pat. No. 3,507,068 and U.S. Pat. No. 4,028,840 are representative of such devices. The block acts as a type of rudder: as the fishing line pulls the block forward, the water acts against the wedge-like leading end to force the block and fishing line away from the line of travel of the boat or the stream bank. In some devices, the fishing line is connected to the block at one or more places. In other devices, two separate lines are used, one running between the boat or fishing pole and the block and one running between the block and the bait and hook.

Several methods of connecting the fishing line to the block have been used in such devices. U.S. Pat. No. 3,507,068 depicts the line tied through a hole in an arm affixed to the block. U.S. Pat. No. 4,920,689 discloses a retaining member which pinches the line to hold it. U.S. Pat. No. 4,524,538 shows a block with an eccentric rotatable member with a vertical tab that pinches the line between the vertical tab and a vertical post mounted to the block.

Numerous disadvantages in these types of devices have been recognized. In those devices which use spring-biased clamps to pinch the line, the available pinching force of the clamp, and therefore the force required to operative the clamp varies greatly with factors such as whether the clamp or fishing line are wet, the strength and size of the type of fish being sought and the line weight. Some devices are therefore provided with a tightening screw to vary the spring-clamping force. The resulting pinching or crushing action, as well as the frictional effect acting on the fishing line positioned in the clamp and rubbing against the clamp's set screw weakens or damages the line, frequently causing breaks. Particularly vulnerable are the smaller and slipperier types of fishing line.

Another disadvantage found in prior art devices is the difficulty in attaching the device to the fishing line and then detaching it from the line after a strike by a fish. Both the device and line must be held while the line is properly configured and tied or attached to the holding elements of the device. Some devices use a clamp of such force that two hands are required to operate it. Such manipulation is made even more challenging by wet or cold equipment and hands as well as the rocking motion of a boat.

Correspondingly, when a strike has occurred, the fisherman must reel in and fight the fish while at the same time attempting to remove the device from the line. Some devices' clamping mechanisms operate to automatically release the fishing line when a strike has occurred, either leaving the device in the water or allowing it to slide down the line toward the fish by means of a clip or eyelet through which the line runs.

Yet another disadvantage is the lack of easy adjustment to allow quick accommodation to changing fishing conditions. For example, large waves, heavier lines or weights, or varying lures may cause some devices to dive or ride too low in the water. Some devices are provided with a fixed weight along their bottom to provide horizontal stability and guidance as the device is pulled through the water. However, larger waves or increasing the weight on the line to cause the bait to run deeper will cause the planer board to ride lower than desired. Rough water also reduces the effectiveness of the device. One solution is disclosed in U.S. Pat. No. 4,028,840 which shows a device with several compartments, each of which can be weighted, preferably with water.

What is needed is a planer board, useful in a variety of fishing conditions for a variety of species, which reduces the stress on attached fishing line, which is easy to attach, release, and adjust and which exhibits improved stability during use.

SUMMARY OF THE INVENTION

Generally speaking, there is provided a planer board for biasing the fishing line to one side while trolling from a boat or fishing from shore, the planer board including a quick-release line-gripping assembly, a quick-release line guidance assembly at its trailing end, an adjustable weight assembly and an improved ramp configuration at its leading end.

The planer board includes a generally flat rectangular body member having front and rear faces, leading and trailing ends and top and bottom edges and having a structure for keeping said member afloat in water, and wherein the leading end is tapered from the front face to the rear face to define at least one ramp to bias said body member to one side as said body member is pulled through the water; a weight connected to the bottom edge of said plate; line-gripping assembly rigidly extending from the front face of said body member for releasably gripping a fishing line; and, a line guidance assembly at the trailing end of said body member for encircling the fishing line and allowing for manual transverse release of the line when desired.

It is an object of the present invention to provide an improved planer board for trolling from a boat or fishing from the shore.

It is also an object of the present invention to provide an improved planer board that has an improved assembly for gripping and guiding the fishing line.

It is another object of the present invention to provide a planer board with a configuration that improves the behavioral characteristics of the board in a variety of fishing conditions and permits for adjustment of such characteristics by the user.

Other objects and advantages of the present invention will become apparent from the following description of the preferred embodiment.

BRIEF DESCRIPTION OF THE DRAWINGS

FIG. 1 is a perspective view of planer board 10 in accordance with the preferred embodiment of the present invention.

FIG. 2 is a top plan view of planer board 10 of FIG. 1.

FIG. 3 is a cross-sectional view of planer board 10 taken along the lines 3—3 of FIG. 2, and viewed in the direction of the arrows, and depicting pin 40 in the slot-closing configuration.

FIG. 4 is a cross-sectional view of planer board 10 taken along the lines 3—3 of FIG. 2, and viewed in the direction of the arrows, and depicting pin 40 in the slot-opening configuration.

FIG. 10 is a cross-sectional view of planer board 10 taken along the lines 3—3 of FIG. 2, and viewed in the direction of the arrows, and depicting pin 40 in an alternative embodiment.

DESCRIPTION OF THE PREFERRED EMBODIMENT

Figure 5:
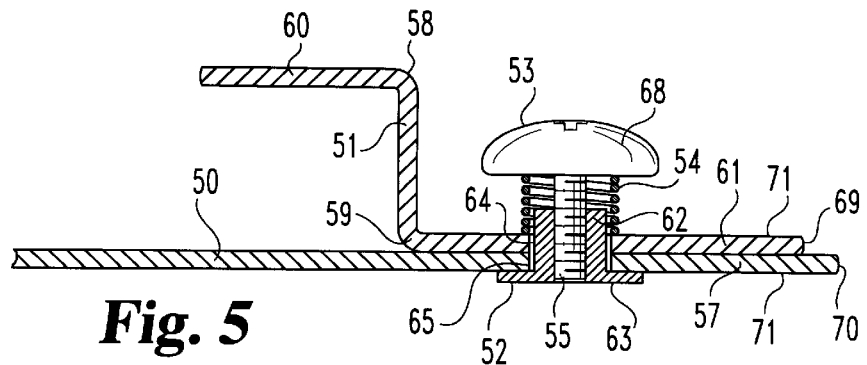
FIG. 5 is a side cross-sectional view of line gripping assembly 12 taken along the lines 5—5 of FIG. 2, and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations and further modifications in the illustrated device, and further applications of the principles of the invention as illustrated therein are contemplated as would normally occur to one skilled in the art to which the invention relates.

Referring to FIG. 1, there is shown a planer board 10 in accordance with the preferred embodiment of the present invention. Planer board 10 comprises a generally flat and rectangular body member or block 11, a line-gripping assembly 12, a line-guidance assembly 13 and an adjustable weight 14.

Referring to FIGS. 1 and 2, block 11 has a generally rectangular cross-section with front and rear faces 17 and 18, respectively, top and bottom edges 21 and 22 respectively, and trailing and leading ends 24 and 25, respectively. The leading end 25 of the block 11 tapers from front face 17 to rear face 18 as shown, and a section is removed or absent midway between the top and bottom edges 21 and 22 to define top and bottom, tapering ramps 26 and 27, respectively, and middle ramping section 28 therebetween. In the embodiment shown in FIGS. 1 and 2, ramping section 28 forms roughly the same angle with rear face 18 as that formed between ramps 26 and 27 and rear face 18. The angle of section 28 may be varied as compared to ramps 26 and 27 to create a desired performance effect or stability characteristic.

At the trailing end 24 of block 11, a narrow, triangular-shaped slot 31 is defined between top and bottom edges 21 and 22, the back edge 32 of slot 31 angling (as shown in FIG. 2) from the intersection of trailing edge 24 and rear face 18 to front face 17 forwardly of trailing edge 24. Slot 31 is preferably formed generally parallel to and midway between top and bottom edges 21 and 22, but it may be formed at varying angles with and/or closer to top or bottom edges 21 and 22 to create a desired behavior in board 10.

Referring to FIGS. 1–3, block 11 defines a passageway or bore 35 that extends parallel and proximal to trailing edge 24. Bore 35 extends from top edge 21 downwardly toward bottom edge 22 enough to pass through and somewhat beyond slot 31, thereby defining coaxial upper and lower bores 36 and 37, respectively. A pin 40 has a head 41 and a shaft 42 that is long enough to extend through both bores 36 and 37. A spring 43 is disposed within bore 36 around shaft 42 as shown. A spring retaining clamp 44 or other appropriate element is connected to shaft 42 at a point along shaft 42 that is above slot 31 when pin 40 is fully disposed within bore 35 as shown in FIG. 3. Upper and lower bores 36 and 37 may be the same diameter or, as shown in FIG. 3, upper bore 36 may be sized to receive spring 43, while lower bore 37 may be sized smaller, but large enough to receive the bottom end of shaft 42. A cover plate 45 is secured to top edge 21 by screws 46 (or other appropriate fasteners), as shown. Cover plate 45 has a hole 47 that is sized large enough to permit telescopic reciprocation of pin 40 therethrough, but small enough to prevent passage of spring 43 therethrough. Plate 45 thus coacts with pin 40 and spring retaining clamp 44 to hold spring 43 in compression within bore 36. Pin 40 is thereby biased downwardly to a slot-closing position (FIG. 3) whereby pin 42 extends through bore 36, across slot 31 and into bore 37. Pin 40 may be pulled against the bias of spring 43, upwardly to a slot-opening position (FIG. 4) at which point pin 42 is at least somewhat clear of slot 31 to permit the transverse release of a fishing line as explained herein.

Referring to FIGS. 1, 2, and 5, there is shown line-gripping assembly 12 which comprises a support post 50, a gripping clip 51, a collar 52, a screw 53 and a spring 54. Post 50 is a generally flat, L-shaped member securely anchored to front face 17 of block 11 by any appropriate means such as screws (not shown). Post 50 tapers outwardly from block 11 to its outboard or distal end 57, the distal end 57 forming an upper clamping surface. Gripping clip 51 is a generally flat member having a pair of right angle bends at 58 and 59 to form a lever plate 60 and a clamping plate 61. Bend 59 forms a heel pivot to permit gripping clip 51 to pivot or rock back and forth at heel pivot 59 atop post 50. Collar 52 defines a cylindrical portion 62 and a disc portion 63 and is internally threaded to receive the threaded shank 55 of screw 53 therethrough. Apertures 64 and 65 in clamping plate 61 and distal end 57, respectively, are sized to receive cylindrical portion 62 of collar 52 therethrough as shown in FIG. 5. Spring 54 is sized to encircle collar 52 and screw shank 55, and to be in a compressive state between the head 68 of screw 53 and clamping plate 61 when screw 53 is screwed into collar 52. Advancement of screw 53 into collar 52 pulls collar 52 and thus distal end 57 against clamping plate 61 under the compressive bias of spring 54. Manually squeezing lever plate 60 toward support post 50 rocks gripping clip 51 about heel pivot 59, thus lifting clamping plate 61, against the bias of spring 54 and away from distal end 57. Advancement and withdrawal of screw 53 varies the clamping force between clamping plate 61 and distal end 57. Aperture 64 is sized large enough relative to collar 52 to permit gripping clip 51 to rock about heel pivot 59 to raise clamping plate 61.

The outboard ends of both clamping plate 61 and distal end 57, or at least those portions between apertures 64 and 65, respectively, and the distal tips 69 and 70 of plate 61 and end 57, respectively, are coated with a polymer 71. Suitable polymers include, for example, rubbers, both synthetic and natural. Suitable synthetic rubbers include those containing styrene, for example, styrene copolymerized with one or more additional mono- or di-unsaturated $C_2$–$C_4$ monomers such as ethylene, propylene, butylene, butadiene, etc. More preferred copolymers are block copolymers, especially those having blocks formed from styrene, ethylene, and butylene.

A most preferred polymer for use in the present invention is a styrene/ethylene/butylene/styrene block copolymer as described in U.S. Pat. No. 4,536,454 which is hereby incorporated herein by reference in its entirety. A preferred commercialized coating is known as Plasti-Dip®, produced by PDI, Incorporated, which contains a block copolymer as described in the U.S. Pat. No. 4,536,454. This particular coating may customarily be thinned before using. It is preferred that the polymer be thinned with a suitable organic solvent such as Thinner for Plasti-Dip® (containing toluene, methyl ethyl ketone. naphtha and hexane) in a ratio of 3 parts Plasti-Dip® to one part Thinner. The coating is typically applied by dipping the gripping plate 61 and distal end 57 separately into the liquid polymer, withdrawing it and allowing it to dry, such procedure being known in the art. The dipping is preferred to be performed such that after the part has been dipped, it is positioned for drying with the distal tips 69 and 70 pointing upwardly. This procedure helps ensure that the resultant coating 71 is as flat as possible. This is important to ensure that the clamping plate 61 and distal end 57 may mate in a common plane to ensure the best grip of a fishing line therebetween. The coating needs to be thick enough to ensure that such coating is not easily eroded, peeled, scraped or otherwise worn off of plate 61 and end 57. Further, such coating, if it could be applied to reliably adhere to the surfaces during usual wear of board 10, may be applied only to the bottom surface of plate 61 and the top surface of end 57. Such coating in association with the structure of line-gripping assembly 12 has been found to substantially enhance the ability to clamp and hold a fishing line 71 between plate 61 and end 57 precisely in the desired manner and under typical fishing conditions.

Referring to FIGS. 1 and 6–8, adjustable weight 14 is shown. Weight 14 is an elongated oval member that defines an elongate slot 74 along its length. Slot 74 is wider at its bottom at 75, thereby defining at its upper region an inwardly extending flange 76 that extends completely around the inside of weight 14. An arbitrary scale 81 is imprinted on front face 17 of block 11 at the bottom thereof with a zero ("0") located at the approximate center of gravity of planer board 10 (without weight 14) when it is horizontally disposed, as shown in FIG. 1. A guide pin 77 is fixed to extend out from the bottom of block 11 somewhat rearwardly of the center of gravity "zero" mark. Weight 14 is held tightly against the bottom edge 22 by a screw 78 which extends through slot 74 and is screwed into block 11 so that the head 79 of screw 78 seats within wider portion 75 of slot 74 and tightly against flange 76. Screw 78 is screwed into block 11 at the center of gravity "zero" mark, and weight 14 is provided with an indicator 82 to indicate the longitudinal midpoint of weight 14. Guided by both guide pin 77 and screw 78, weight 14 may be slid forwardly or rearwardly along bottom edge 22 and tightened thereat to change the center of gravity of planer board 10 and thus vary the behavior of board 10 in use in the water. The variable setting of weight may be controlled by viewing the positionment of indicator 82 relative to scale 81.

Referring to FIGS. 1 and 2, there is also shown a semi-circular fin 85, affixed to or integrally formed with block 11 on front face 17. In the embodiment shown, fin 85 extends perpendicularly from front face 17 and is angled downwardly from front to rear as shown in FIG. 1. While fin 85 substantially as shown has been found to enhance the stability of planer board 10, it may be angled or shaped differently to achieve a specific behavioral characteristic of board 10 in use.

Figure 9:
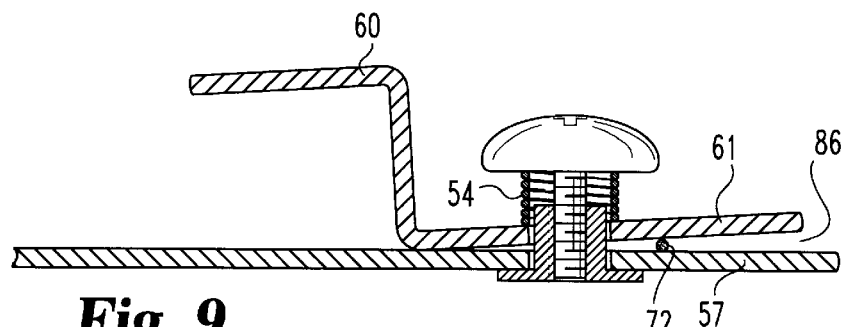
FIG. 9 is a view of line gripping assembly 12 of FIG. 5, but with line gripping assembly 12 shown in the open position.
Figure 6:
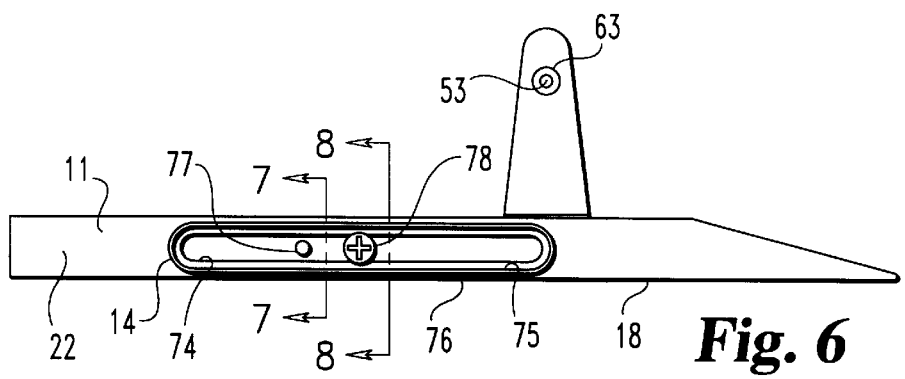
FIG. 6 is a bottom plan view of planer board 10 of FIG. 1.
Figure 7:
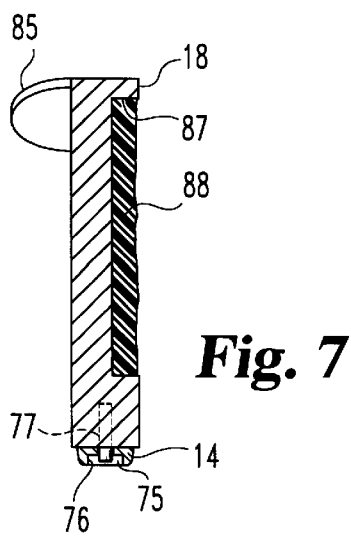
FIG. 7 is a side cross-sectional view of planer board 10 taken along the lines of 7—7 of FIG. 6 and viewed in the direction of the arrows.
Figure 8:
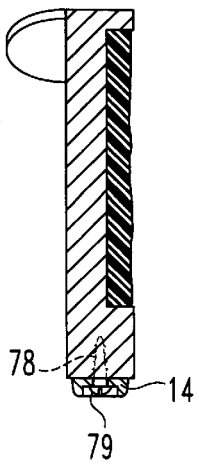
FIG. 8 is a side cross-sectional view of planer board 10 taken along the lines of 8—8 of FIG. 6 and viewed in the direction of the arrows.

In one embodiment, additional buoyancy is provided by creating a rectangular recess 87 in the back face 18 of block 11 and securing an appropriate buoyant material 88, such as Styrofoam®. In one embodiment, material 88 comprises polyethylene in a foam like configuration. Such buoyant material 88 may be secured within recess 87 by any appropriate means such as glue. The exact size and positionment of the recess as well as the buoyant material may vary with factors such as the composition and size of block 11 and the mass of weight 14. In one embodiment block 11 is made of a polycarbonate material such as high impact copolymer polypropylene, but other materials such as wood are also contemplated. In operation, planer board 10 is attached to fishing line 72, as shown in FIG. 1, by squeezing lever plate 60 toward support post 50, thereby rocking glipping clip 51 about heel pivot 59 to an open position whereby clamping plate 61 is lifted away from distal end 57 of post 50 against the bias of spring 54 as shown in FIG. 9. Fishing line 72 may then be easily inserted with the free hand of the user into the gap 86 between clamping plate 61 and distal end 57. Releasing lever 60 causes gripping plate 61 to return to a clamping position as biased by spring 54 whereby fishing line 72 is firmly held between plate 61 and end 57. Pin 40 is then (or first) raised to the slot-opening position (FIG. 4.), fishing line 72 is transversely positioned within the slot 31, and pin 40 is released whereby spring 43 pulls pin 40 down to the slot closing position (FIG. 3), thereby trapping the fishing line 72 securely within slot 31. Disengagement of fishing line 72 from planer board 10 is accomplished by performing the above steps in reverse order. Weight 14 is adjusted to the desired position and board 17 is now ready for use. When fishing for strong fish such as salmon or white bass, screw 53 may be set somewhat more loosely than normal so that the line will pull free of line gripping assembly 12 and not add to the drag exerted by the fish.

In another, preferred embodiment shown in FIG. 10, block 11 is formed so that recess 87 extends rearwardly to encompass and replace bore 35. A hole 89 is drilled down from top edge 21 past slot 31 as before to form lower bore 37. In assembly, spring 43 is placed in recess 87 in alignment with hole 89 and bore 37 while pin 40 is inserted through hole 89, spring 43 and into bore 37. While holding spring 43 in compression up against the upper edge 90 of recess 87, spring retaining clamp 44 is affixed to pin 40 as shown. This configuration obviates the need for plate 45 and facilitates the assembly of line guidance assembly 13.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A planer board, comprising:

a generally flat rectangular body member having front and rear faces, leading and trailing ends and top and bottom edges and having means for keeping said member afloat in water, and wherein the leading end is tapered from the front face to the rear face to define at least one ramp to bias said body member to one side as said body member is pulled through the water;

a weight connected to the bottom edge of said plate;

line-gripping means rigidly extending from the front face of said body member for releasably gripping a fishing line, said line-gripping means including a support post rigidly connected to said body member and a gripping clip mounted to pivot relative to the support post, and wherein the support post defines a clamping surface at its distal end and the gripping clip is bent to define a pivot heel, a clamping plate outward of the pivot heel and a lever plate inward of the pivot heel, the gripping clip being positioned with the clamping plate and pivot heel atop the clamping surface and the gripping clip able to rock at its pivot heel atop the support post; and, line guidance means at the trailing end of said body member for encircling the fishing line and allowing for manual transverse release of the line when desired.

2. The planer board of claim 1 wherein:

said line-gripping means further includes a collar having a disc portion disposed against the underside of the support post and having a cylinder portion extending up through aligned openings in the support post and the clamping plate, and further includes a headed screw with a shank screwed into the cylinder portion and a resilient member disposed in compression between the screw head and the clamping plate.

3. The planer board of claim 2 wherein:

the resilient member is a coil spring encircling both the screw shank and the cylinder portion of the collar, the spring biasing the gripping clip to a clamped position with the clamping portion bearing against the clamping surface, the force of said biasing being adjustable by the extent to which the screw is screwed into the collar.

4. The planer board of claim 3 wherein:

at least a portion of both said support post and said gripping clip are coated with a polymer.

5. The planer board of claim 4 wherein the polymer is a rubber.

6. The planer board of claim 5 wherein the rubber is a synthetic rubber.

7. The planer board of claim 6 wherein the synthetic rubber contains styrene.

8. The planer board of claim 7 wherein the synthetic rubber is a styrene copolymer with one or more mono- or di-unsaturated $C_2$–$C_4$ monomers.

9. The planer board of claim 8 wherein the copolymer is a block copolymer.

10. The planer board of claim 9 wherein the copolymer has styrene, ethylene and butylene blocks.

11. The planer board of claim 10 wherein the block co-polymer is a styrene/ethylene/butylene/styrene block copolymer.

12. The planer board of claim 3 wherein:

at least a portion of both said support post and said gripping clip are coated with a polymer.

13. The planer board of claim 12 wherein the polymer is a rubber.

14. The planer board of claim 13 wherein the rubber is a synthetic rubber.

15. The planer board of claim 14 wherein the synthetic rubber contains styrene.

16. The planer board of claim 15 wherein the synthetic rubber is a styrene copolymer with one or more mono- or di-unsaturated $C_2$–$C_4$ monomers.

17. The planer board of claim 16 wherein the copolymer is a block copolymer.

18. The planer board of claim 17 wherein the copolymer has styrene, ethylene and butylene blocks.

19. The planer board of claim 18 wherein the block co-polymer is a styrene/ethylene/butylene/styrene block copolymer.

20. The planer board of claim 3 wherein:

the at least one ramp comprises an upper ramp and a lower ramp and a middle ramping section therebetween.

21. The planer board of claim 20 wherein:

the upper and lower ramps are coplaner and extend forwardly of the middle ramping section.

22. The planer board of claim 3 further including means for adjusting said weight forwardly and rearwardly.

23. The planer board of claim 22 wherein:

said means for adjusting includes said weight being oval-shaped with a longitudinal central slot and further includes a guide element extending from said body member through the central opening.

24. A planer board, comprising:

a generally flat rectangular body member having front and rear faces, leading and trailing ends and top and bottom edges and having means for keeping said member afloat in water, and wherein the leading end is tapered from the front face to the rear face to define at least one ramp to bias said body member to one side as said body member is pulled through the water;

a weight connected to the bottom edge of said plate;

line-gripping means rigidly extending from the front face of said body member for releasably gripping a fishing line; and line guidance means at the trailing end of said body member for encircling the fishing line and allowing for manual transverse release of the line when desired, said line guidance means including slot means connected with said body member for providing a slot through which the fishing line may extend and including a pin releasably extending across the slot to transversely trap the fishing line within the slot.

25. The planer board of claim 24 wherein:

said slot means includes a slot defined in the trailing end of said body member.

26. The planer board of claim 25 wherein:

said pin has a head and a shaft and said line guidance means further includes a passageway defined at the trailing end and extending down from the top edge of said body member through and past the slot, the passageway sized to receive the shaft of the pin for telescopic reciprocation therethrough.

27. The planer board of claim 26 wherein said line guidance means further includes a spring operationally connected between said pin and said body member to bias the shaft of said pin to extend across the slot.

* * * * *